E. R. BEEMAN.
WHEEL.
APPLICATION FILED JULY 21, 1919.
1,425,073.
Patented Aug. 8, 1922.
2 SHEETS—SHEET 1.
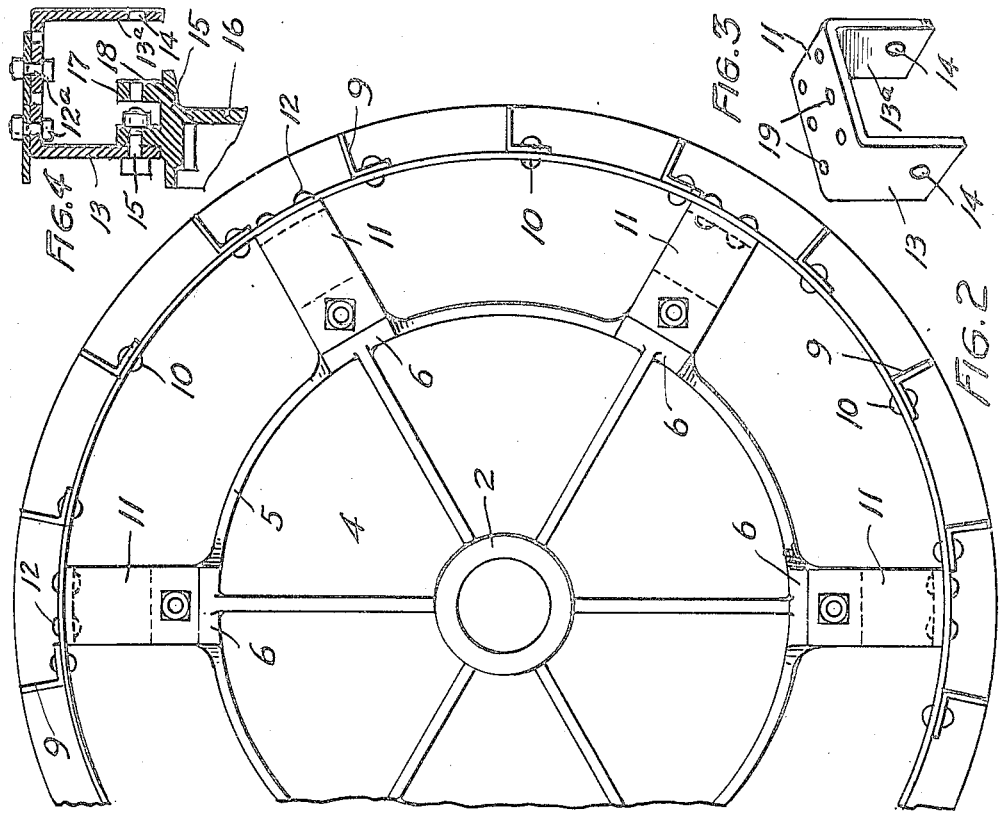
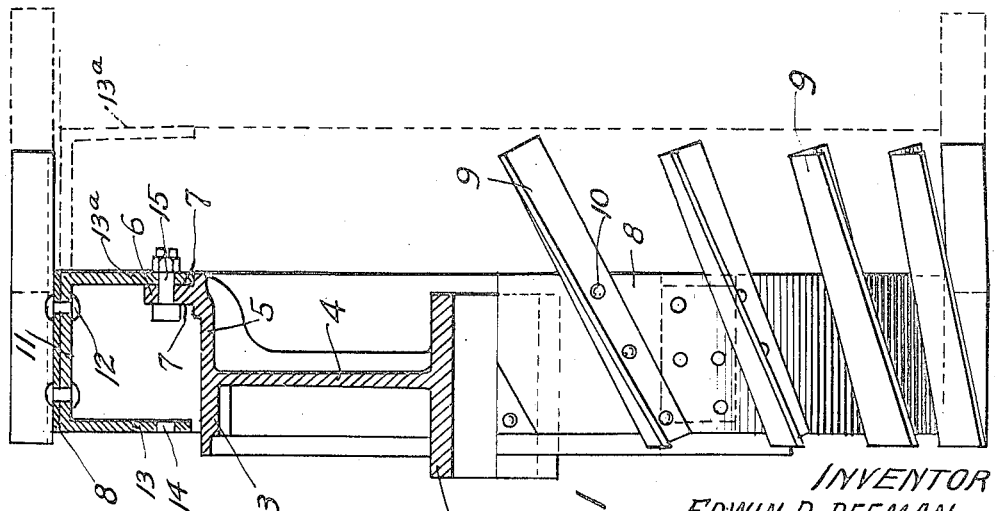
INVENTOR.
EDWIN R. BEEMAN
BY
HIS ATTORNEYS.

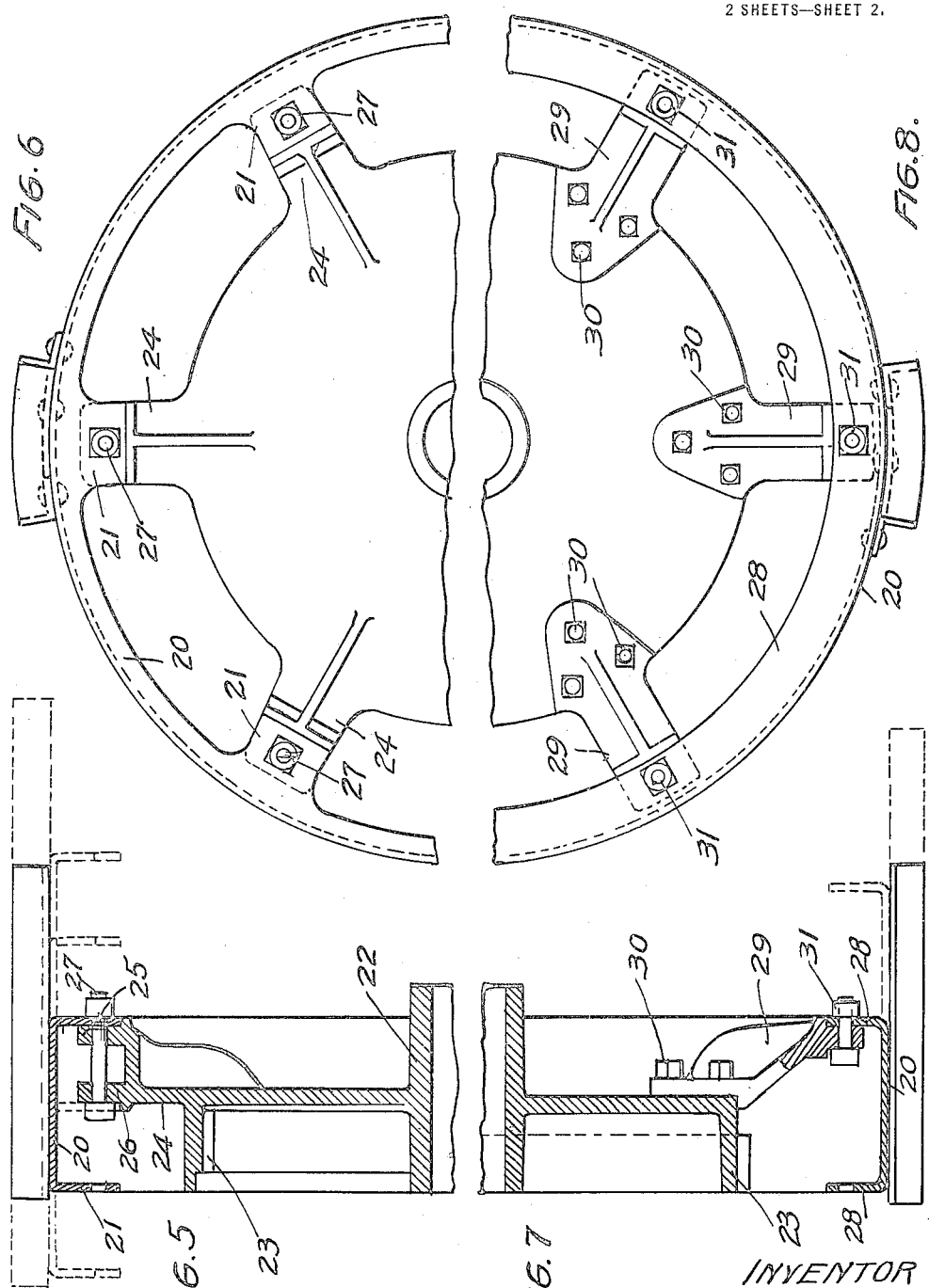

UNITED STATES PATENT OFFICE.

EDWIN R. BEEMAN, OF MINNEAPOLIS, MINNESOTA, ASSIGNOR TO BEEMAN TRACTOR COMPANY, OF MINNEAPOLIS, MINNESOTA, A CORPORATION OF MINNESOTA.

WHEEL.

1,425,073.          Specification of Letters Patent.      Patented Aug. 8, 1922.

Application filed July 21, 1919. Serial No. 312,377.

*To all whom it may concern:*

Be it known that I, EDWIN R. BEEMAN, a citizen of the United States, resident of Minneapolis, county of Hennepin, State of Minnesota, have invented certain new and useful Improvements in Wheels, of which the following is a specification.

My invention relates to wheels and particularly those of the traction type and the primary object of the invention is to provide means for increasing or decreasing the width of tread of a machine and increasing thereby the traction without the necessity of removing the wheels and substituting others therefor.

A further object is to improve the wheel shown and described in Letters Patent of the United States, No. 1,307,035, issued to me June 17, 1919.

The invention consists generally in various constructions and combinations, all as hereinafter described and particularly pointed out in the claims.

In the accompanying drawings forming part of this specification—

Figure 1 is an edge view, partially in section, of a wheel embodying my invention, Figure 2 is a side elevation of the same, Figure 3 is a detail view of one of the U-shaped clips removed from the rim, Figure 4 is a detail sectional view showing a slight modification, Figure 5 in a detail view showing a modified construction of the rim and hub, Figure 6 is a side view of the same, Figure 7 is a view corresponding to Figure 5, showing another modification, Figure 8 is a side view of the construction shown in Figure 7.

In the drawing, 2 represents the hub of the wheel. 3 is a gear ring in this case shown as internal as a preferable construction, though I do not confine myself thereto, connected with the hub by a suitable web 4. The ring 3 is provided with an annular flange 5 on which a series of lugs 6 are formed at intervals around the circumference of the flange. These lugs are preferably provided with seats 7 in their opposite vertical faces. 8 represents a rim of suitable width having thereon a plurality of traction ribs consisting preferably of angle plates 9 arranged obliquely upon the peripheral surface of the rim and secured thereto by suitable means, such as rivets 10. These ribs are preferably mounted on the rim to extend beyond one edge thereof, as indicated in Figure 1, thereby to a considerable extent increasing the tractive power of the wheel.

It is desirable in a wheel of this type to so mount the rim with respect to the hub that the effective width or thread of the machine can be materially changed to adapt it for straddling rows of plants where the invention is used on a garden tractor, and making the machine more suitable for cultivating plants where there is variation in the distance between the rows. With this end in view I provide a series of U-shaped clips 11 secured to the inner face of the rim 8 by suitable means, such as rivets 12 or bolts $12^a$. These clips have parallel arms 13 and $13^a$ projecting inwardly from the inner face of the wheel rim and these arms have end portions adapted to fit the seat 7 of the lug 6 and are provided with holes 14 through which bolts 15 may be inserted and through similar holes in the lugs 6 for locking the arms and lugs firmly together.

From an examination of Figure 1 it is evident that by changing the adjustment of the clips on the supporting lugs the width of tread of the machine may be varied to a considerable extent. In the figure, the arms $13^a$ of the clips are shown secured to the outer faces of the lugs. These may be secured to the inner face, if preferred, making the tread slightly narrower, only amounting, however, to the thickness of the lugs. I have indicated in dotted lines in this figure the extreme or maximum width or tread of the machine, which could be obtained by mounting the arms 13 on the outer faces of the lugs in place of the arms $13^a$. This would move the wheel rim outwardly a distance equal to its width, while a corresponding lateral adjustment would be obtained for the traction ribs or cleats. With this construction 4 adjustments are possible, two for each of the arms 13 and $13^a$ on the opposite sides of the supporting lugs, all without the necessity of reversing the rim, it being merely necessary to loosen the bolts and change the position of the arms supporting the rim on the lugs.

The arms 13 and $13^a$ may be mounted in various ways on the flange of the gear ring. I have illustrated the lugs as a simple convenient means of fastening the arms and the hub together, but it will be understood that this fastening means is susceptible of many modifications, the essential feature being the idea of the plurality of lateral adjustments of the rim with respect to the hub to adapt the machine for different widths of tread.

The gear ring and the flange 5 really form in effect an inner rim that is rigidly mounted with respect to the hub, while the outer rim forming the tread of the wheel is adjustable on the inner rim for varying the width of tread of the machine.

In Figure 4 I have shown an inner rim 15 supported by a web 16 and having lugs 17 radiating therefrom, provided with seats 18 for the arms, with clips which correspond substantially to those described with reference to Figure 1, and which I will designate by the same reference numeral. The clip, however, is mounted to project slightly beyond the edge of the rim.

The lugs 17 are preferably formed in pairs by cutting out the middle portion of the metal and, as shown, the outer lugs overhang the web considerably and allow for a greater range of adjustment for increasing the width of tread. A further advantage in having the lugs in pairs is that the number of adjustments of the clips thereon is considerably increased.

I also prefer to provide a plurality of holes 19 in the clips, making them capable of lateral adjustment on the rim by removal of the rivets, bolts, or other securing means, all of which construction leads to a greater range of movement of the traction rim with respect to the hub.

In Figure 5 I have shown a rim 20 having lugs 21 formed integrally thereon, preferably by folding or bending the edges of the rim inwardly toward the hub and then cutting away the metal to form a series of lugs 21.

The hub 22 has a gear ring 23 and brackets 24 provided with parallel lugs 25 and 26 having seats to receive the lugs 21 and secured thereto by suitable means, such as bolts 27. The lugs 21 may be adjusted on either face of the lugs 25 and 26, and each lug is thereby capable of two adjustments on each of the hub bracket lugs. In assembling the parts, the lugs 25 and 26 are inserted between the flanges of the rim between the lugs 21 thereof and when properly assembled may be rigidly secured by means of bolts passing through both the rim and wheel lugs.

In Figure 7 I have shown a modification which consists in providing a continuous annular flange 28 on each edge of the rim, preferably by bending the edges of the rim inwardly, as shown in Figure 8. Brackets 29, preferably of cast metal, are secured to the flange of the hub by suitable means, such as bolts 30, and are secured to the flanges 28 by suitable means, such as bolts 31. The inwardly turned flanges 28 may be secured to either side of the lugs 21 and each flange will therefore have an adjustment transversely of the wheel equal to the width of the rim less the thickness of the lugs.

I claim as my invention:

1. A wheel comprising a hub, an inner rim having spoke connections with said hub and provided with a gear ring, the peripheral surface of said rim having outwardly projecting lugs arranged in pairs thereon at intervals around the rim, said lugs being spaced apart and having seats formed thereon, an outer rim having cleats transversely mounted thereon and clips comprising flat metal portions secured to the inner face of said outer rim and provided with inwardly projecting parallel end portions which are adapted to fit the seats on said lugs, and bolts passing transversely through said lugs and the end portions of said clips for securing them together, and the adjustment of the end portions of said clips on said lugs varying the degree or offset of said outer rim with respect to said inner rim.

2. A wheel comprising a hub, a rim having a flange connection, an outer rim, members radiating inwardly therefrom upon opposite sides of the vertical axis of said outer rim, and means for securing said members on said inner rim to adjust said outer rim laterally with respect to said hub and inner rim.

3. A wheel comprising a hub, an inner rim therefor, an outer rim, U-shaped clips secured to the inner face of said outer rim and having arms projecting inwardly therefrom in substantially parallel relation, and means for mounting said arms on said inner rim to vary the position of said outer rim with respect to said hub.

4. A wheel comprising a hub, an inner rim therefor, an outer rim, and traction clips thereon, members arranged in pairs in opposing relation on the inner face of said outer rim and projecting inwardly therefrom, and means for mounting said members on said inner rim to adjust said outer rim and its traction clips laterally with respect to said hub and inner rim.

5. A wheel comprising a hub, an inner rim therefor, an outer rim, clips secured to the inner face of said outer rim and having inwardly projecting parallel arms and arranged at intervals around the rim, said inner rim having seats for said arms and means for securing said arms on said seats, one group of arms supporting said outer rim in one position with respect to the inner rim, and the other group of arms supporting said outer rim in another position with respect to the inner rim.

6. A wheel comprising a hub, an inner rim therefor provided with outwardly projecting lugs, an outer rim having inwardly projecting members adapted to be seated one at a time on said inner lugs and secured thereto, the adjustment of said outer rim members on the lugs of said inner rim changing the position and the lateral adjustment of the outer rim with respect to the inner rim.

7. A wheel comprising a hub, an inner rim connected with said hub and provided with a gear ring, an outer rim, substantially U-shaped clips having flattened middle portions adapted to be seated against the inner face of the outer rim and secured thereto and provided with inwardly projecting arms, said inner rim having outwardly projecting lugs formed thereon provided with seats to receive the ends of said arms for offsetting said outer rim with respect to the plane of the inner rim, and bolts mounted in said arms and lugs for securing them together.

In witness whereof, I have hereunto set my hand this 12" day of July, 1919.

EDWIN R. BEEMAN.